(12) United States Patent
Sasage et al.

(10) Patent No.: US 7,690,035 B2
(45) Date of Patent: Mar. 30, 2010

(54) SYSTEM AND METHOD FOR PREVENTING FRAUD OF CERTIFICATION INFORMATION, AND RECORDING MEDIUM STORING PROGRAM FOR PREVENTING FRAUD OF CERTIFICATION INFORMATION

(75) Inventors: Taiji Sasage, Yokohama (JP); Shougo Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1027 days.

(21) Appl. No.: 11/236,636

(22) Filed: Sep. 28, 2005

(65) Prior Publication Data

US 2006/0179315 A1    Aug. 10, 2006

(30) Foreign Application Priority Data

Feb. 8, 2005    (JP)    ............................. 2005-031633

(51) Int. Cl.
*G06F 21/00*    (2006.01)
(52) U.S. Cl. .............................. 726/22; 726/23; 726/24; 726/25; 726/26; 726/27
(58) Field of Classification Search ...................... 707/3; 713/153, 176, 201; 709/203; 726/22, 24, 726/26, 23, 27
See application file for complete search history.

(56) References Cited

U.S. PATENT DOCUMENTS 7,269,852 B2 * 9/2007 Uemura et al. ................ 726/26
7,451,487 B2 * 11/2008 Oliver et al. ................... 726/24
7,457,823 B2 * 11/2008 Shraim et al. ............. 707/104.1
2002/0059364 A1 * 5/2002 Coulthard et al. ............ 709/203
2002/0112162 A1 * 8/2002 Cocotis et al. ............... 713/176
2005/0228782 A1 * 10/2005 Bronstein et al. ............... 707/3

FOREIGN PATENT DOCUMENTS

JP    2002-222286    8/2002

* cited by examiner

*Primary Examiner*—Nasser Moazzami
*Assistant Examiner*—Ghazal Shehni
(74) *Attorney, Agent, or Firm*—Staas & Halsey LLP (57) ABSTRACT

A system for preventing fraud of certification information performs a processing step of processing web page data, a first comparing step of comparing the web page data processed in the processing step with web page data stored in a web page storage unit in association with URL of the data, a second comparing step of comparing URLs of the web page data similar to each other when the first comparing step determines that the web page data are similar to each other, and an address attention message adding step of adding an address attention message to the web page data processed in the processing step when the second comparing step determines that the URLs differ. Therefore, a user who is to access a web site can determine whether or not this web site is authentic, and certification information fraud can be prevented beforehand.

10 Claims, 10 Drawing Sheets

Fig. 1 certification information table G 1 2 1 (U 2 4 1)

G1211(U2411) G1212(U2412)　　　　　　　G121r(U241r)

| address | 1st parameter | 2nd parameter | 3rd parameter | |
|---|---|---|---|---|
| http://www.abcdbank.co.jp | 014 | 7162534 | 4132 | ... |
| http://xyzcredit.co.jp | 4152637 | 1192 | – | ... |
| http://onetwoclub.login.jsp | | | – | ... |
| : | : | : | : | : |

Fig. 2 web page information table (U 2 4 2)

G1221(U2421)　　　　　G1222(U2422)

G122r(U242r)

| address | link information |
|---|---|
| http://www.abcdbank.co.jp | data/www.abcdbank.co.jp/001.bmp |
| http://xyzcredit.co.jp | data/xyzcredit.co.jp/001.bmp |
| http://onetwoclub.login.jsp | data/onetwoclub.login.jsp/001.bmp |
| . | . |
| . | . |

Fig. 3 web page appearance information G 1 2 3 (U 2 4 3)

| Welcome to Abcdbank Online. |

Branch No.: ☐

Account No.: ☐

Password : ☐

Please feel free to contact the Abcdbank Online Help Desk if you have further questions.
Call 0123-45-678 (toll-free, domestic)
Call 71-23-203-9217 (chargeable, overseas)
Copyright (C) 1998-2002 abcdcorp
* Abcdbank(R) Online and AbcdPhone Banking are service marks registered and used by Abcdbank, N.A. and Abcdcorp throughout

Fig. 4 trial attention message G 1 2 4 2 (U 2 4 4 2)

Fig. 5 address attention message G 1 2 4 1 (U 2 4 4 1)

SYSTEM AND METHOD FOR PREVENTING FRAUD OF CERTIFICATION INFORMATION, AND RECORDING MEDIUM STORING PROGRAM FOR PREVENTING FRAUD OF CERTIFICATION INFORMATION

BACKGROUND OF THE INVENTION

1. Field of the Invention

The present invention generally relates to an anti-phishing technique. More specifically, the present invention relates to a method for preventing theft, or so-called phishing (pronounced "fishing"), of personal financial information, such as passwords and credit card numbers, through spoofs of authentic e-mails from or web sites of financial institutions, and to a recording medium having a program recorded thereon.

2. Description of the Related Art

With the recent popularity of online interaction via the Internet, there has been a wider range of victims of fraud called phishing.

Phishing is fraud via e-mails from spoofers of real banks, credit card companies, shopping sites, etc., which link to "trap" web sites which look like the banks, shopping sites, etc., so as to entice users into giving their personal information, such as credit card numbers and passwords. An increasing number of victims accessing false web sites that appear identical to the authentic web sites have "fished" for the certification information by malicious scams via fake URLs (uniform resource locators) using Javascript code or with the address bar hidden in a pop-up window. Phishing is therefore a serious problem.

Japanese Unexamined Patent Application Publication No. 2002-222286 discloses an anti-fraud system. In this system, a third-party organization stores, as "white" web pages, portions of web pages collected via various search sites whose attributes of the registered information or identity information have been successfully confirmed by a URL registration organization or telephone directory information. In response to a request from a check requester or the like, it is checked whether a specified web page is white or black, or the specified web page is checked against IP (Internet protocol) addresses of existing web pages written and stored in a Java applet. If no match is found, it is determined that this web site is not administered by an authorized server, and this determination is reported to users and the owner of the authentic web page.

In the technique disclosed in this publication, the authenticity of a web site is checked for using a third-party organization or an applet on the page. If the IP address of the web site written in the web page or the Java applet itself is tampered with, the authenticity of the web page is not checked for unless an investigation request is submitted to and a response is obtained from the third-party organization.

Phishing, on the other hand, is a fraudulent attempt to mislead users into thinking they are going to access trusted web sites and into providing their certification information, and may not be prevented unless it is determined whether or not a web site to be accessed by a user is authentic before the user accesses the web site. Thus, a problem still remains.

SUMMARY OF THE INVENTION

In view of the foregoing problems, it is an object of the present invention to provide a method for preventing fraud of certification information and a recording medium having a program recorded thereon, in which it can be determined whether or not a web site to be accessed by a user is authentic before the user accesses the web site, thereby preventing theft of the certification information beforehand.

In an aspect of the present invention, a method of a system for preventing fraud of certification information includes an acquisition step where web page data is acquired, an appearance comparison step where the web page data acquired in the acquisition step is compared with web page appearance information stored in an information storage unit in association with web page address information and certification information, and a trial step where a web page processing request is output when the information storage unit stores similar web page appearance information to the web page data acquired in the acquisition step as a result of comparison performed in the appearance comparison step, the web page processing request being configured such that trial information different from the certification information in place of the certification information stored in association with the similar web page appearance information is set to the web page data acquired in the acquisition step.

In this document, a data communication request on a network to be communicated via HTTP (hypertext transfer protocol), HTTPS (hypertext transfer protocol security), etc., is referred to as a "web page processing request".

According to the present invention, information on a web page for certification of an authentic access site is stored in advance in a web page storage unit. When a web page is acquired, the acquired web page is compared with the web page stored in the web page storage means. If these web pages look similar to each other, certification information associated with the similar web page is replaced by trial information before a web page processing request is output. Therefore, a user can recognize he/she is going to access to a different web page that looks like the authentic web site before accessing the web page, thereby preventing fraud of the certification information beforehand.

DESCRIPTION OF THE PREFERRED EMBODIMENTS

Figure 1:
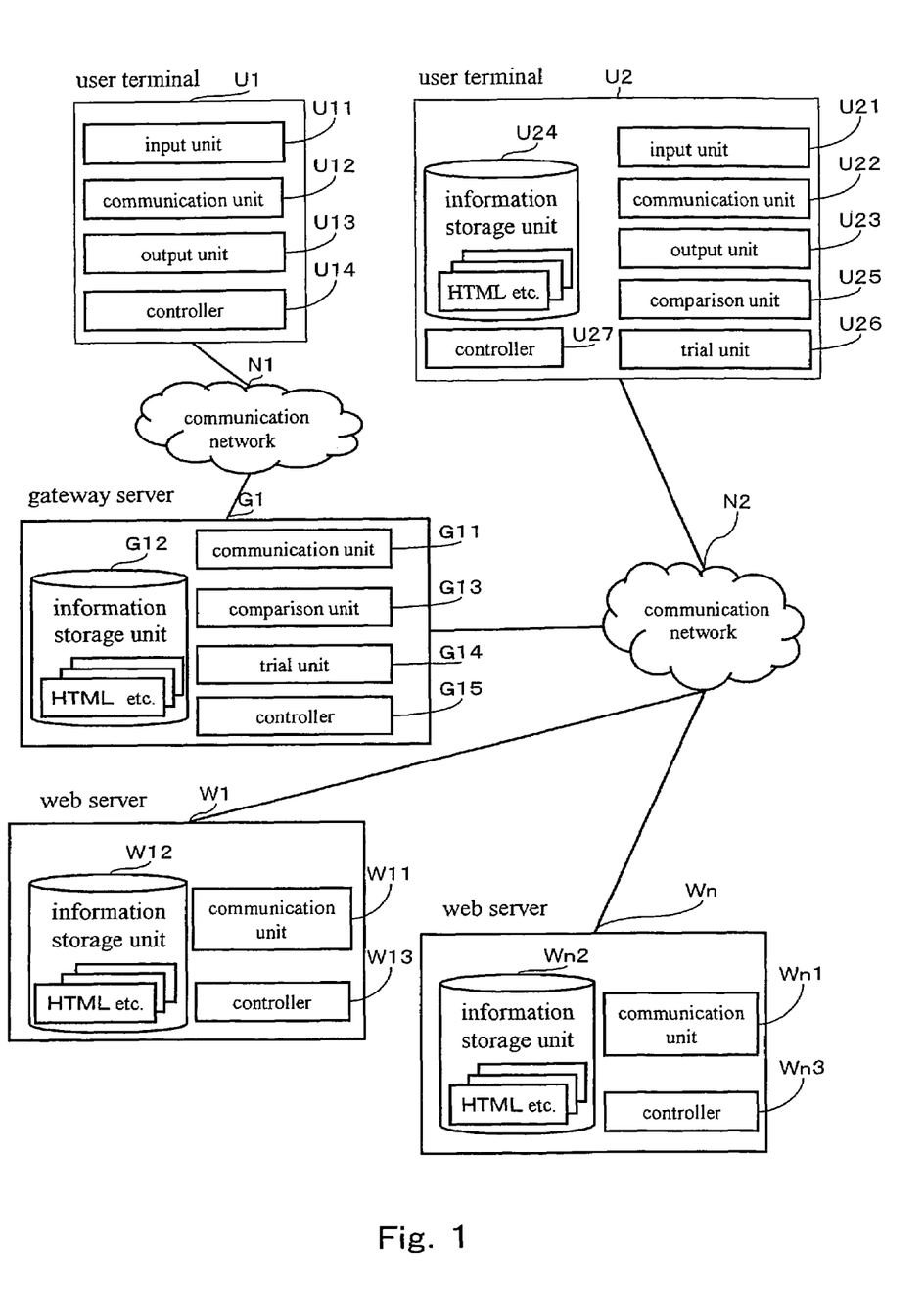
FIG. 1 is a schematic block diagram of a system for preventing fraud of certification information.

A system for preventing fraud of certification information according to an embodiment of the present invention will be described with reference to the drawings. First, the system overview will be described with reference to FIG. 1. FIG. 1 is a block diagram schematically showing the structure of a system for preventing fraud of certification information according to the present invention.

In FIG. 1, a user terminal U1 is an information processor, such as a computer, a portable telephone, or a personal digital assistant (PDA), including an input unit U11 operated by a user to input information, e.g., a keyboard, a mouse, etc., a communication unit U12 transmitting and receiving information to and from a gateway server G1 connected via a communication network N1, such as an intranet, and a user terminal U2 and web servers W1 to Wn connected via a communication network N2, such as the Internet, an output unit U13 such as a display for outputting the information input via the input unit U11 or the information received via the communication unit U12, and a controller U14 controlling these components to provide user terminal functions.

The gateway server G1 is an information processor, such as a computer, including a communication unit G11 transmitting and receiving information to and from the user terminal U1 connected via the communication network N1 and the user terminal U2 and the web servers W1 to Wn connected via the communication network N2, an information storage unit G12 storing the information received via the communication unit U12, a comparison unit G13 comparing the information received via the communication unit G11 with the information stored in the information storage unit G12, a trial unit G14 generating different transmission information when the information received via the communication unit G11 meets predetermined conditions, and a controller G15 controlling these components to provide a gateway service. The information stored in the information storage unit G12 is described in detail below.

The user terminal U2 is an information processor, such as a computer, a portable telephone, or a PDA, including the components of the user terminal U1 and the gateway server G1. The user terminal U2 includes an input unit U21 operated by a user to input information, e.g., a keyboard, a mouse, etc., a communication unit U22 transmitting and receiving information to and from the gateway server G1 and the web servers W1 to Wn connected via the communication network N2, an output unit U23 such as a display for outputting the information input via the input unit U21 or the information received via the communication unit U22, an information storage unit U24 storing the information input by the user via the input unit U21 or the information received via the communication unit U22, a comparison unit U25 comparing the input information input via the input unit U21 or the information received via the communication unit U22 with the information stored in the information storage unit U24, a trial unit U26 generating different information when the information input via the input unit U21 meets predetermined conditions, and a controller U27 controlling these components to provide user terminal functions. The information stored in the information storage unit U24 is described below.

The web servers W1 to W11 are information processors, such as computers, including communication units W11 to Wn1 transmitting and receiving information to and from the user terminal U2 and the gateway server G1 connected via the communication network N2, and the user terminal U1 connected to the gateway server G1 via the communication network N1, information storage units W12 to Wn2 storing the information received via the communication units W11 to Wn1, and controllers W13 to Wn3 controlling these components to provide web services.

The communication network N1 is a communication network, such as an intranet, via which data is transmitted and received between the user terminal U1 and the gateway server G1 via a line or wirelessly.

The communication network N2 is a communication network, such as the Internet, via which data is transmitted and received among the user terminal U2, the gateway server G1, and the web servers W1 to Wn via lines or wirelessly.

Figure 2:
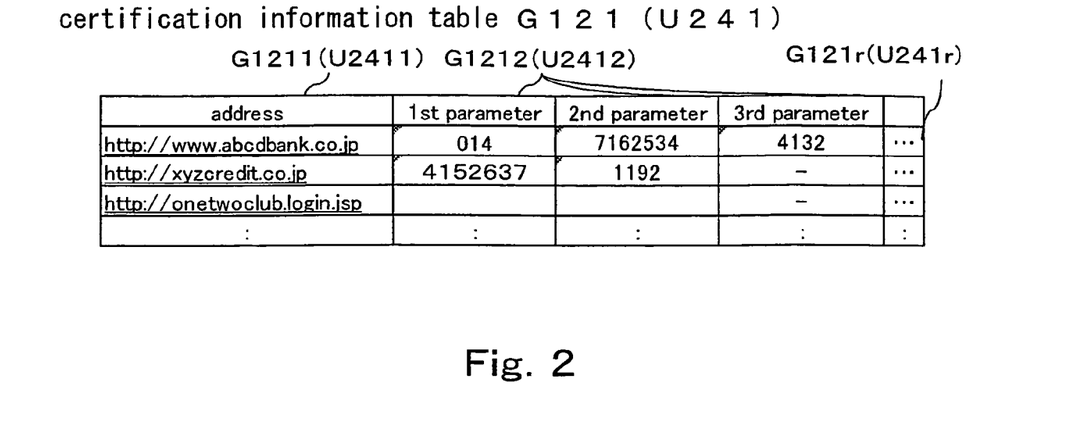
FIG. 2 is a certification information table.

FIG. 2 shows a certification information table G121 (U241) to be stored in the information storage unit G12 of the gateway server G1 (or the information storage unit U24 of the user terminal U2). The certification information table G121 (U241) stores certification information in association with an address of an authentic web page to be input on a user basis based on an input and registration instruction from the user terminal U1 (or U2). In an embodiment, the certification information table G121 (U241) includes a certification information record G121r (U241r) having an address G1211 (U2411) and one or more parameters G1212 (U2412). Although the address is a URL, by way of example, any other address of a web server for identifying the location of the web page, such as an IP address or a MAC address, or a combination thereof may be used. There may be a plurality of parameters G1212 (U2412) corresponding to the number of certification information entry fields on the web page, and an account number or a login ID and a password associated therewith are generally included.

Figure 3:
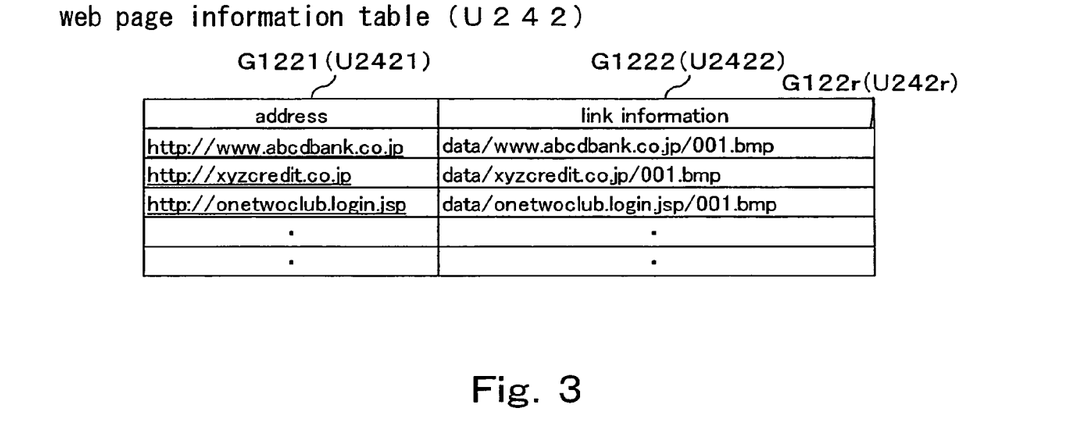
FIG. 3 is a web page information table.

FIG. 3 shows a web page information table G122 (U242) to be stored in the information storage unit G12 of the gateway server G1 (or the information storage unit U24 of the user terminal U2). The web page information table G122 (U242) stores information about screen appearance information in association with an address of an authentic web page based on an input and registration instruction from the user terminal U1 (or U2). In an embodiment, the web page information table G122 (U242) includes a certification information record G122r (U242r) having an address G1221 (U2421) and link information G1222 (U2422) to the storage location of appearance information data in which a piece of appearance information is represented by a web page.

Figure 4:
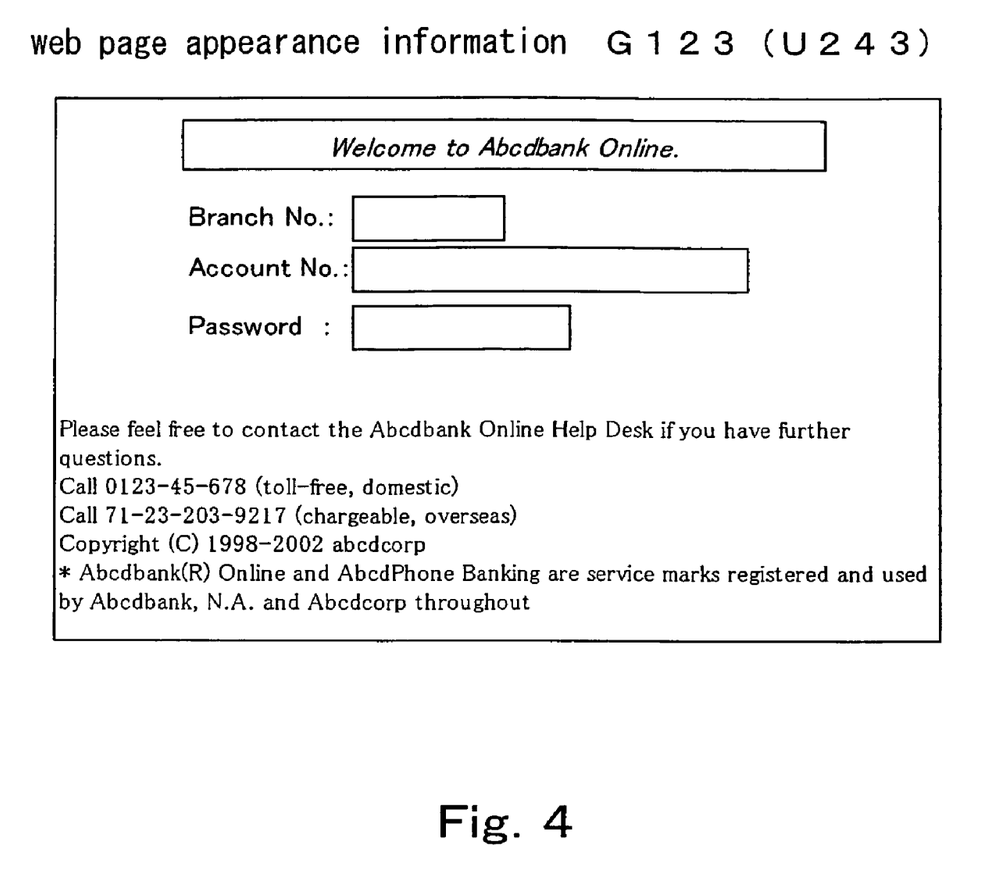
FIG. 4 is a view of web page appearance information.

FIG. 4 shows authentic web page appearance information G123 (U243) to be stored in the information storage unit G12 of the gateway server G1 (or the information storage unit U24 of the user terminal U2). In an embodiment, appearance information in which web page information is converted into a bitmap format is shown, by way of example, which is merely an example of the appearance information in a uniform format for comparison to identify a web page displayed via a browser, that is, an appearance that misleads users into believing they are browsing the authentic web page. Any other known uniform method for expressing displayed web page views in a uniform format, such as JPEG (Joint Photographic Experts Group) or PDF (Portable Document Format), may be used. Thus, web pages displayed that look similar to each other can be detected even if the HTML of these web pages differs. The web page information may be converted into a format such as a bitmap using a known method; the conversion method will not be described because it does not constitute the gist of the present invention. The similarity in appearance between web pages may be determined to some extent by simply comparing the HTML of the web pages without converting the format, and therefore, simple comparison in HTML may be performed.

Figure 5:
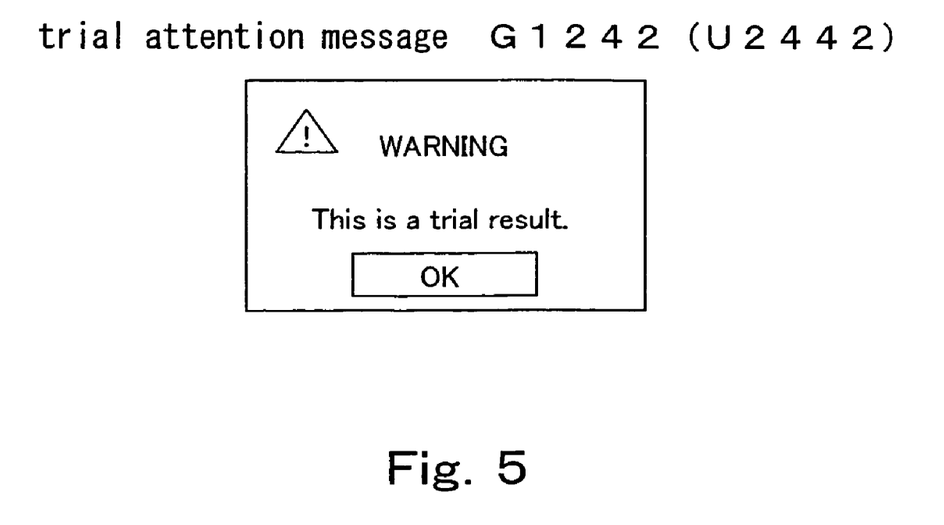
FIG. 5 is a view of a trial attention message.
Figure 6:
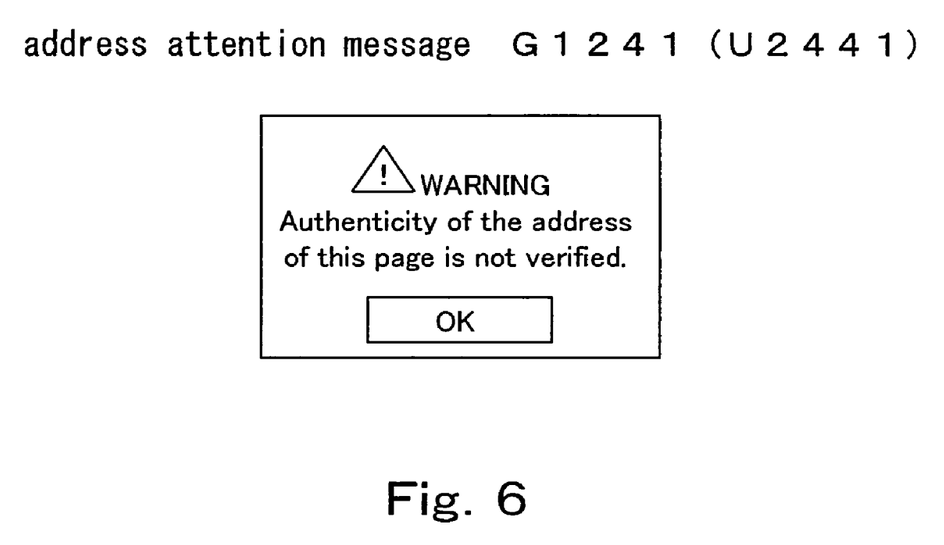
FIG. 6 is a view of an address attention message.

FIG. 5 shows a trial attention message G1242 (U2442) indicating a trial result, and FIG. 6 shows an address attention message G1241 (U2441) indicating that the authenticity of the address is not verified. The trial attention message G1242

(U2442) and the address attention message G1241 (U2441) are stored in the information storage unit G12 of the gateway server G1 (or the information storage unit U24 of the user terminal U2). Although these messages are pop-up messages, by way of example, in an embodiment, these messages may be expressed by any other method that can be output by the user terminal U1 or U2, e.g., frame division, by using a browser toolbar, adding HTML, etc. These messages may also be simply indicated by an audible warning, an optical warning by emitting high-brightness light or turning on and off a light.

Figure 7:
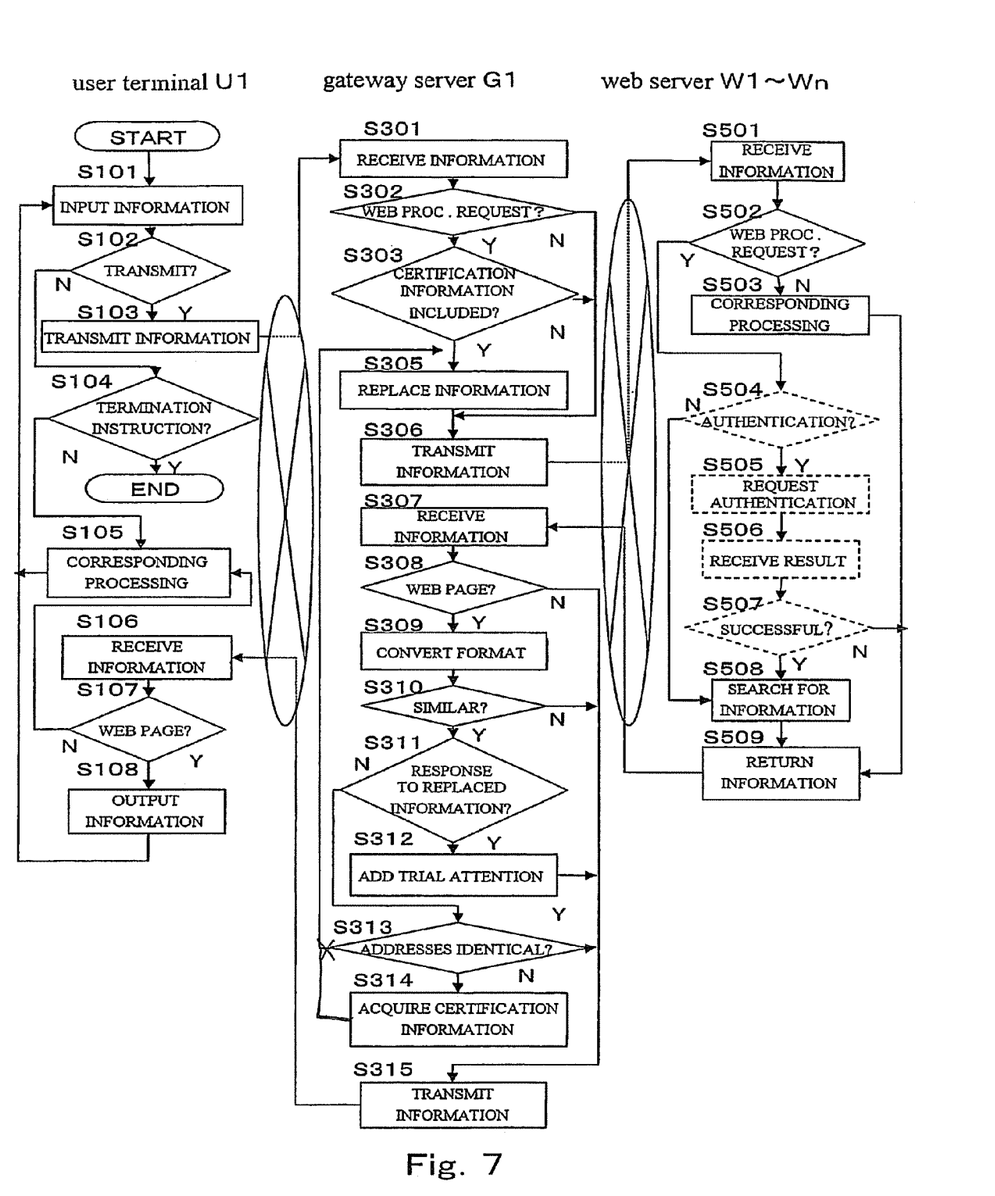
FIG. 7 is a flowchart showing a process for preventing fraud of certification information according to a first embodiment of the present invention.

A method for preventing fraud of certification information according to a first embodiment of the present invention will now be described with reference to FIG. 7. FIG. 7 is a flowchart showing a process of the method for preventing fraud of certification information according to the first embodiment of the present invention.

The user terminal U1 receives input information via the input unit U11 by a user operation to enter a URL from the keyboard or to click a link in an e-mail using the mouse (step S101). Then, the controller U14 determines whether or not an information transmission instruction is input (step S102). If it is determined that an information transmission instruction is input (Yes in step S102), information is transmitted from the communication unit U12 to the communication network N1 based on the information input in step S101 (step S103). In this example, a web page processing request destined to a web server having the input URL domain is sent. The input that is determined in step S102 to be a transmission instruction may further include a web page uploading instruction and an e-mail transmission instruction. However, these instructions are not directly related to the gist of the present invention, and a detailed description thereof is thus omitted.

If a transmission instruction is not input in step S101 (No in step S102), it is determined whether or not a termination instruction is input (step S104). If a termination instruction is input, the process ends.

When the communication unit U12 receives information from the communication network N1 (step S106), the controller U14 determines whether or not the received information includes a web page (step S107). If it is determined that the information includes a web page (Yes in step S107), the web page is output to the output unit U13 (step S108). Then, the process returns to step S101.

If the controller U14 determines in step S104 that a termination instruction is not input (No in step S104), and determines in step S107 that the information does not include a web page (No in step S107), different processing is performed depending upon the information (step S105). Then, the process returns to step S101. The details of the processing of step S105 are not directly related to the gist of the present invention, and a description thereof is thus omitted.

When the gateway server G1 receives information via the communication unit G11 from the communication network N1 (step S301), the controller G15 determines whether or not the received information includes a web page processing request (step S302). If the information does not include a web page processing request (No in step S302), for example, if the information includes a web page uploading request or an e-mail transmission request, this information is transmitted as transmission information in step S306.

If the received information includes a web page processing request (Yes in step S302), the comparison unit G13 refers to the certification information table G121 (see FIG. 2) stored in advance in the information storage unit G12, and further determines whether or not the received information includes the same value as any of the parameters G1212 (step S303). In general, most web pages authenticate communication using the SSL encryption technology, etc., whereas fake web pages for phishing activity do not adopt such security technology and may therefore send unencrypted certification information. It is easily determined whether or not certification information is included using existing character string search techniques.

If the received information does not include the same value as any of the parameters G1212 (No in step S303), the received information is transmitted as transmission information in step S306. If the information includes the same value as any of the parameters G1212 (Yes in step S303), the trial unit G14 generates transmission information by replacing the received information with different trial information (step S305). The trial information may be trial information that is registered in association with each value of the parameters G1212 indicating a piece of certification information in the certification information table G121 stored in the information storage unit G12, trial information in which the pieces of certification information are re-ordered, trial information obtained by generating random numbers, or trial information generated by any other method for generating different information from the certification information. The trial information may also be any combination thereof. After this processing, the transmission information is transmitted to the communication network N2 (step S306).

When information is received via the communication unit G11 from the communication network N2 (step S307), the controller G15 determines whether or not the received information includes a web page (step S308). If it is determined that the received information does not include a web page (No in step S308), the received information is transmitted as the transmission information in step S315.

If the controller G15 determines that the received information includes a web page (Yes in step S308), the comparison unit G13 converts this web page into the same format as the web page appearance information G123 stored in the information storage unit G12 (step S309), and compares it with the web page appearance information G123 stored in the information storage unit G12 to determine whether or not there is a similar appearance (step S310). If the comparison unit G13 determines that there is no similar appearance (No in step S310), the information received in step S307 is transmitted as the transmission information in step S315.

If the comparison unit G13 determines that there is a similar appearance (Yes in step S310), the controller G15 determines whether or not the received information is a response to the transmission information generated by replacement in step S305 (step S311). If it is determined that the information is a response to the transmission information generated by replacement in step S305 (Yes in step S311), the trial attention message G1242 shown in FIG. 5 is added to the information received in step S307 (step S312).

Figure 8:
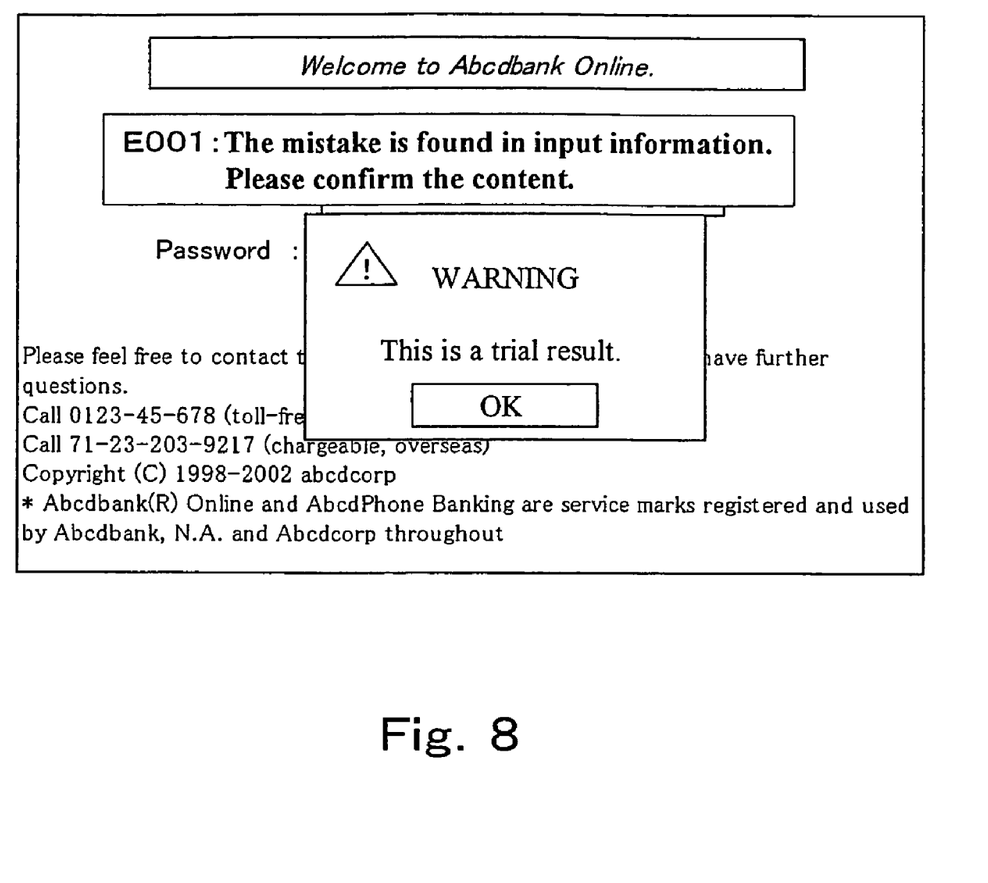
FIG. 8 is an output web page view with the trial attention message.

For example, an authentic web page actually performs authentication to check for authenticity, and reports an authentication result. In this case, when different trial information from the certification information is generated in step S305 and is transmitted, an authentication error occurs, and a web page including information indicating the same entry and the authentication error or a web page including instruction information to click a return button to input information again from the beginning because of the error is sent back from the authentic web page. A false web page for phishing, however, does not perform actual authentication, and information indicating successful login may be sent from this false web page. The trial attention message G1242 shown in FIG. 5 is added to this web page, and the resulting information is transmitted as the transmission information in step S315. FIG. 8 shows an-output web page with the trial attention message G1242 shown in FIG. 5.

If the controller G15 determines that the received information is not a response to the transmission information generated by replacement in step S305 (No in step S311), the comparison unit G13 refers to the web page information table G122 (see FIG. 3) stored in advance in the information storage unit G12, and acquires and compares the address G1221 associated with the file name G1222 of the web page appearance information G123 that is determined as the similar appearance in step S310 with the address of the received web page to determine whether or not these addresses are identical (step S313). If the addresses are identical (Yes in step S313), the received web page is authentic, and the process proceeds to step S315. On the other hand, a web page of a phishing site has a different address even if it looks like the authentic web page. Thus, if the addresses differ from each other (No in step S313), the parameter G1212 associated with the address G1211 having the same value as the address G1221 is acquired by referring to the certification information table G121 (step S314). The acquired parameter G1212 is replaced with different trial information by the trial unit G14 in step S305, and the replaced information is set to the web page acquired in step S307. In step S315, the transmission information is transmitted to the communication network N1.

The web servers W1 to Wn perform identical processing. When the web servers W1 to Wn receive information via the communication units W11 to Wn1 from the communication network N2 (step S501), the controllers W13 to Wn3 determine whether or not the received information includes a web page processing request (step S502). If the received information includes a non-web page processing request, e.g., a web page uploading request (No in step S502), different processing for, for example, storing it in the information storage units W12 to Wn2 is performed (step S503), and the process proceeds to step S509. The details of the processing of step S503 are not directly related to the gist of the present invention, and a description thereof is thus omitted.

If the controller G15 determines in step S502 that the received information includes a web page processing request (Yes in step S502), it further determines whether or not authentication is necessary (step S504). If authentication is necessary (Yes in step S504), an authentication request is transmitted from the communication units W11 to Wn1 to an authentication server (not shown) (step S505), and an authentication result is received (step S506). It is then determined whether or not the authentication result indicates successful authentication (step S507). If the information received in step S501 includes a web page processing request (Yes in step S502) but does not include an authentication request (No in step S504), or if the authentication result received in step S506 indicates successful authentication (Yes in step S507), the information storage units W12 to Wn2 are searched for the requested information (step S508). The requested information, if searched for, or a report indicating that the information is not searched for, otherwise, is returned from the communication units W11 to Wn1 to the information request source as a response to the web page processing request (step S509). If the authentication result received in step S505 indicates an authentication error (No in step S507), an authentication error report is returned in step S509.

In addition to the process described above, in order to manage a series of operations (sessions) including a plurality of web page processing requests, cookies for uniquely identifying users are issued and managed. However, this is not directly related to the gist of the present invention, and a description thereof is thus omitted.

Figure 9:
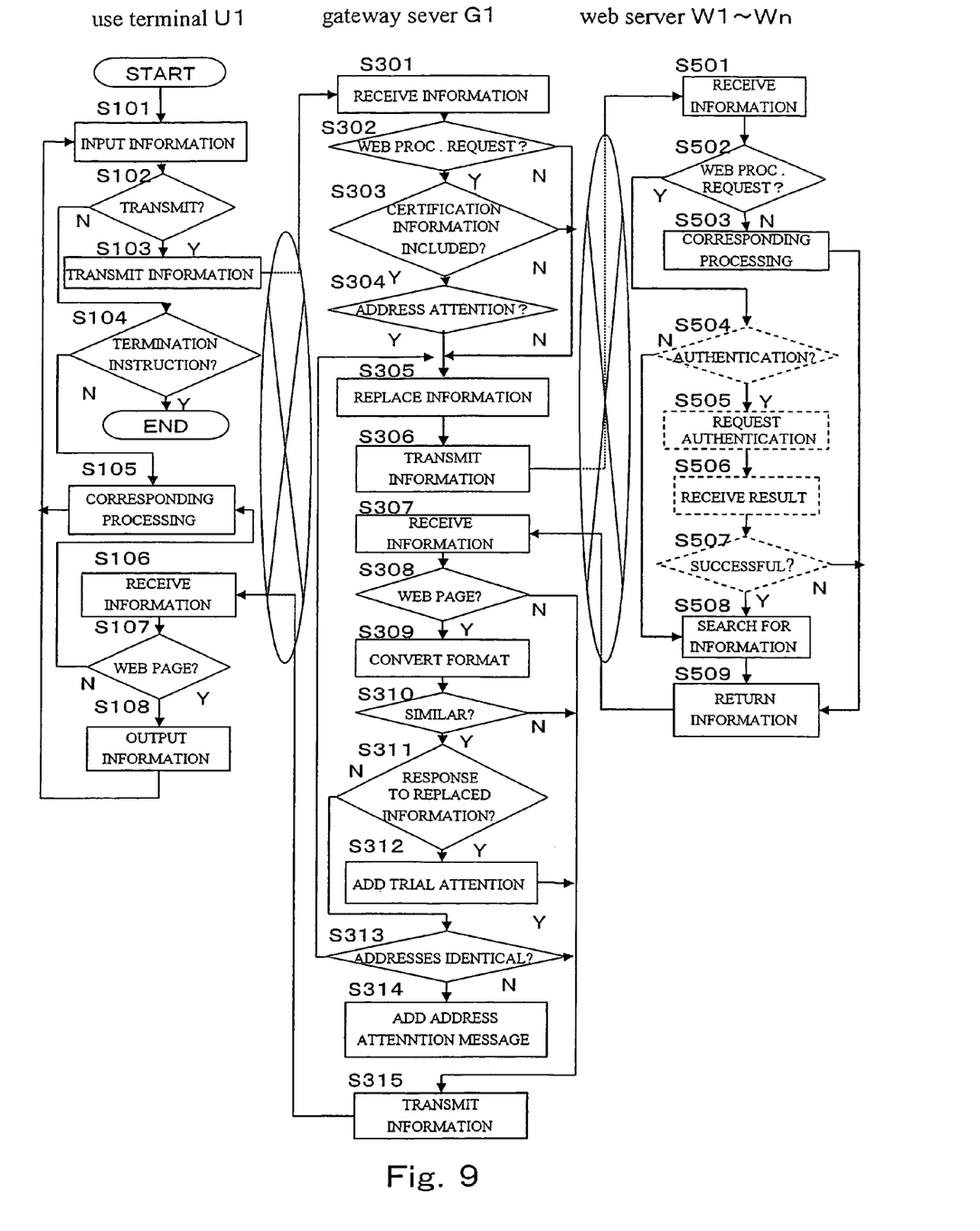
FIG. 9 is a flowchart showing a process for preventing fraud of certification information according to a second embodiment of the present invention.

The first embodiment may be modified. A method for preventing fraud of certification information according to a second embodiment of the present invention will be described with reference to FIG. 9. FIG. 9 is a flowchart showing a process of a system for preventing fraud of certification information according to the second embodiment. In comparison to the process of the method for preventing fraud of certification information according to the first embodiment shown in the flowchart of FIG. 7, the process shown in FIG. 9 further includes the processing of step S304, and the processing of step S314 is different. These different points will be described hereinafter.

In step S304, if the comparison unit G13 determines that the received information includes the same value as any of the parameters G1212 by referring to the certification information table G121 (see FIG. 2) stored in advance in the information storage unit G12 (Yes in step S303), the controller G15 determines whether or not the input information includes a web page in which the address attention message G1241 shown in FIG. 6 is added in step S314, described below (step S304). If it is determined that the information does not include the web page in which the address attention message G1241 shown in FIG. 6 is added (No in step S304), the received information is transmitted as the transmission information in step S306. If it is determined that the received information includes the web page in which the address attention message G1241 shown in FIG. 6 is added (Yes in step S304), the processing of step S305 for replacing the information is performed.

Figure 10:
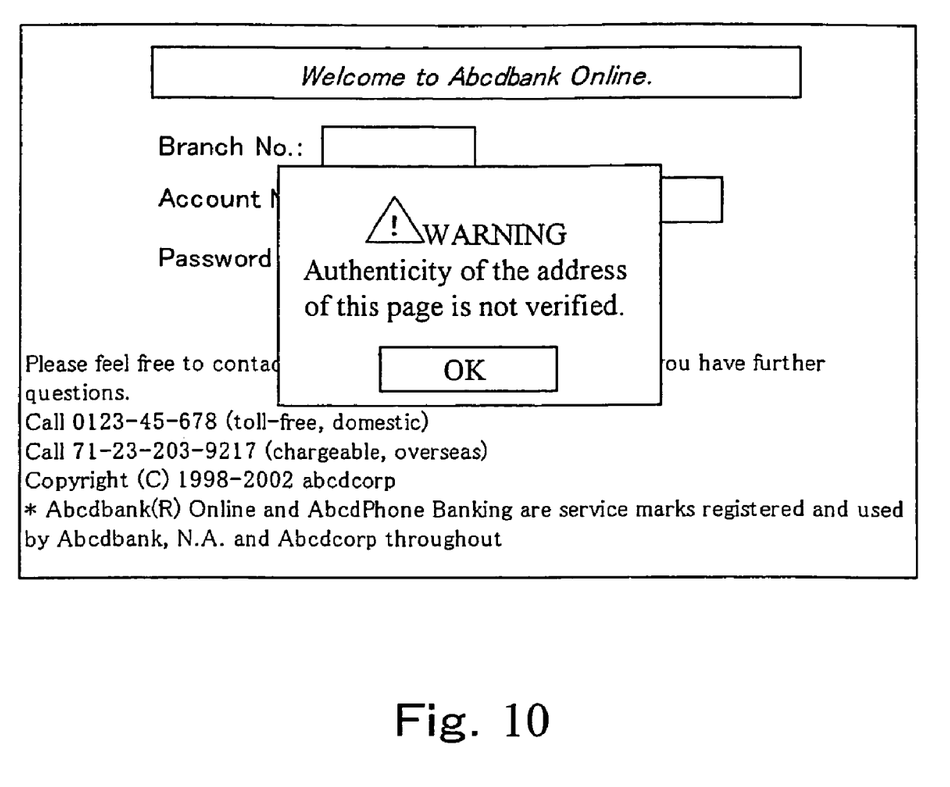
FIG. 10 is an output web page view with the address attention message.

In step S314, if the comparison unit G13 compares the address G1221 associated with the file name G1222 of the web page appearance information G123 that is determined as the similar appearance in step S310, which is processed from the web page information table G122 (see FIG. 3) stored in advance in the information storage unit G12, with the address of the received web page, and the addresses differ from each other (No in step S313), the address attention message G1241 shown in FIG. 6 is added to the information received in step S307, and the resulting information is transmitted as the transmission information in step S315. FIG. 10 shows a web page with the address attention message G1241.

Figure 11:
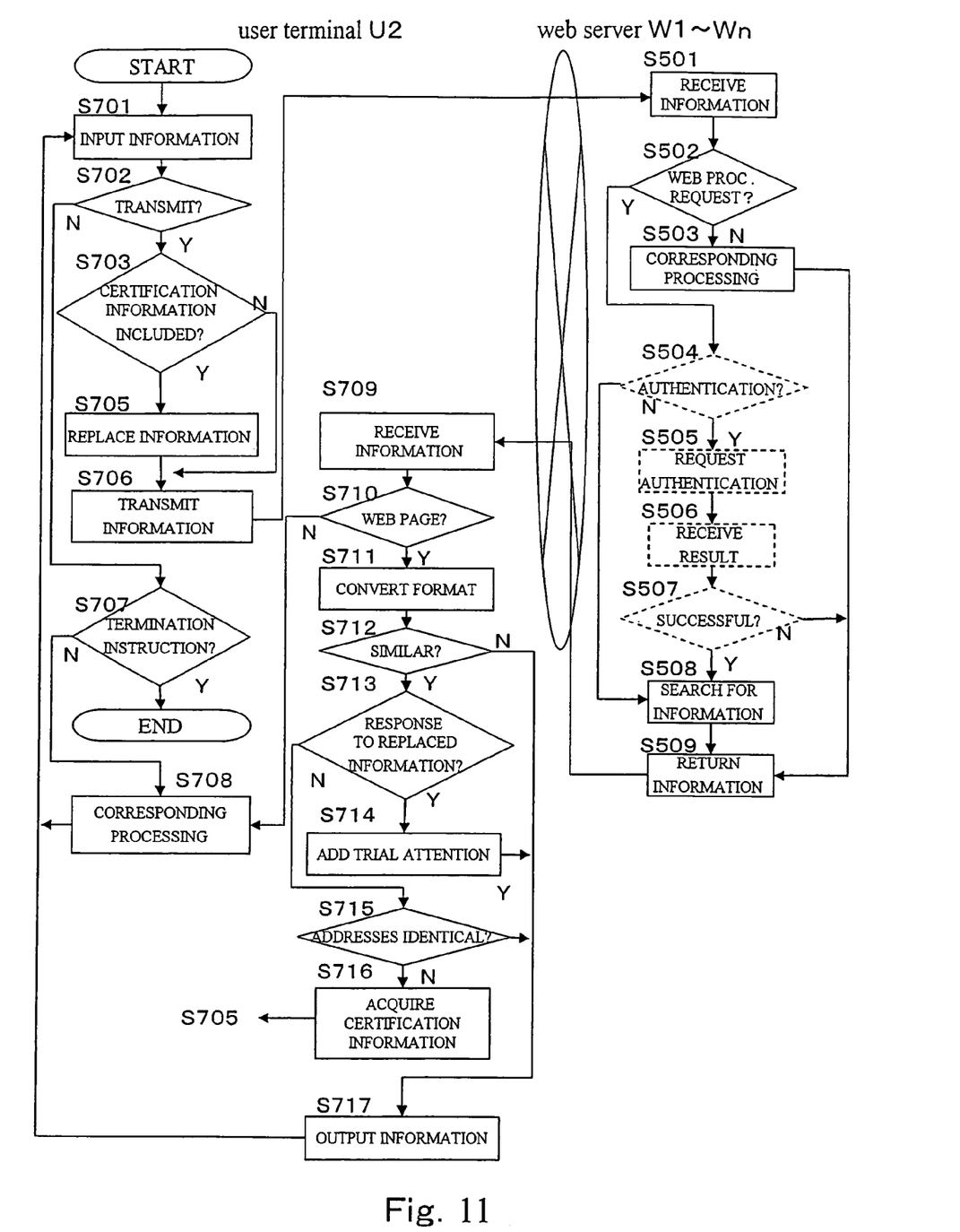
FIG. 11 is a flowchart showing a process for preventing fraud of certification information according to a third embodiment of the present invention.

A method for preventing fraud of certification information according to a third embodiment of the present invention will be described with reference to FIG. 11. FIG. 11 is a flowchart showing a process of a system for preventing fraud of certification information according to the third embodiment. This embodiment corresponds to the process shown in FIG. 7, and the processing performed by the user terminal U1 and the gateway server G1 shown in FIG. 7 is performed by the user terminal U2.

When the user terminal U2 receives input information from the input unit U21 by a user input from the keyboard or a click using the mouse (step S701), the controller U27 determines whether or not an information transmission instruction is input (step S702). The input that is determined in step S702 to be a transmission instruction may include a web page processing request, a web page uploading instruction, an e-mail transmission instruction. The instructions other than the web page processing request are not directly related to the gist of the present invention, and a detailed description thereof is thus omitted.

If it is determined in step S702 that the information includes a transmission instruction, the comparison unit U25 determines whether or not information to be requested by the instruction input in step S701 includes the same value as any of the parameters U2412 by referring to the certification information table U241 (see FIG. 2) stored in advance in the information storage unit U24 (step S703). If the information does not include the same value as any of the parameters U2412 (No in step S703), the information requested by the instruction input in step S701 is transmitted as the transmission information in step S706. If the information includes the same value as any of the parameters U2412 (Yes in step S703), the trial unit U26 replaces this information with different trial information (step S705). The trial information may be generated by any generating method described above with reference to step S305 shown in FIG. 7.

In step S706, the requested information is transmitted from the communication unit U22 to the communication network N2 (step S706). If a transmission instruction is not input in step S701 (No in step S702), the controller U27 determines whether or not a termination instruction is input (step S707). If a termination instruction is input, the process ends.

If the controller U27 determines in step S707 that a termination instruction is not input (No in step S707) and if it determines in step S710, described below, that the information does not include a web page (No in S710), different processing is performed depending upon the information (step S708). Then, the process returns to step S701. The details of the processing of step S708 are not directly related to the gist of the present invention, and a description thereof is thus omitted.

When the communication unit U22 of the user terminal U2 receives information from the communication network N2 (step S709), the controller U27 determines whether or not the received information includes a web page (step S710). If it is determined that the received information does not include a web page (No in step S710), the process proceeds to step S708.

If the controller U27 determines in step S710 that the received information includes a web page (Yes in step S710), the comparison unit U25 converts this web page into the same format as the web page appearance information U243 stored in the information storage unit U24 (step S711), and compares it with the web page appearance information U243 stored in the information storage unit U24 to determine whether or not there is a similar appearance (step S712). If there is no similar appearance (No in step S712), then in step S717, the received information is directly output from the output unit U23 (step S717).

If the comparison unit U25 determines in step S712 that there is a similar appearance (Yes in step S712), the controller U27 determines whether or not the received information is a response to the information transmitted in step S706 after replacing the information in step S705 (step S713). If it is determined that the information is the response (Yes in step S713), the trial attention message U2442 shown in FIG. 5 is added to the information received in step S709 (step S714), and the resulting information is output from the output unit U23 in step S717. An output web page with the trial attention message U2442 shown in FIG. 6 is shown in FIG. 8.

If the controller U27 determines in step S713 that the received information is not the response (No in step S713), the comparison unit U25 refers to the web page information table U242, and acquires and compares the address U2421 associated with the file name U2422 of the web page appearance information U243 that is determined as the similar appearance in step S712 with the address of the web page received in step S709 to determine whether or not these addresses are identical (step S715). If the addresses are identical, the received web page is authentic, and then in step S717, this information is output from the output unit U23. On the other hand, a web page of a phishing site has a different address even if it looks like the authentic web page. Thus, if the addresses differ from each other (No in step S715), the parameter U2412 associated with the address U2411 having the same value as the address U2421 acquired in step S715 is acquired by referring to the certification information table U241 (step S716). The trial unit G14 replaces the acquired parameter U2412 with different trial information in step S706, and the resulting information is set to the web page acquired in step S709.

The operation of the web servers W1 to Wn shown in FIG. 11 is the same as that shown in FIGS. 7 and 9, and a description thereof is thus omitted.

Figure 12:
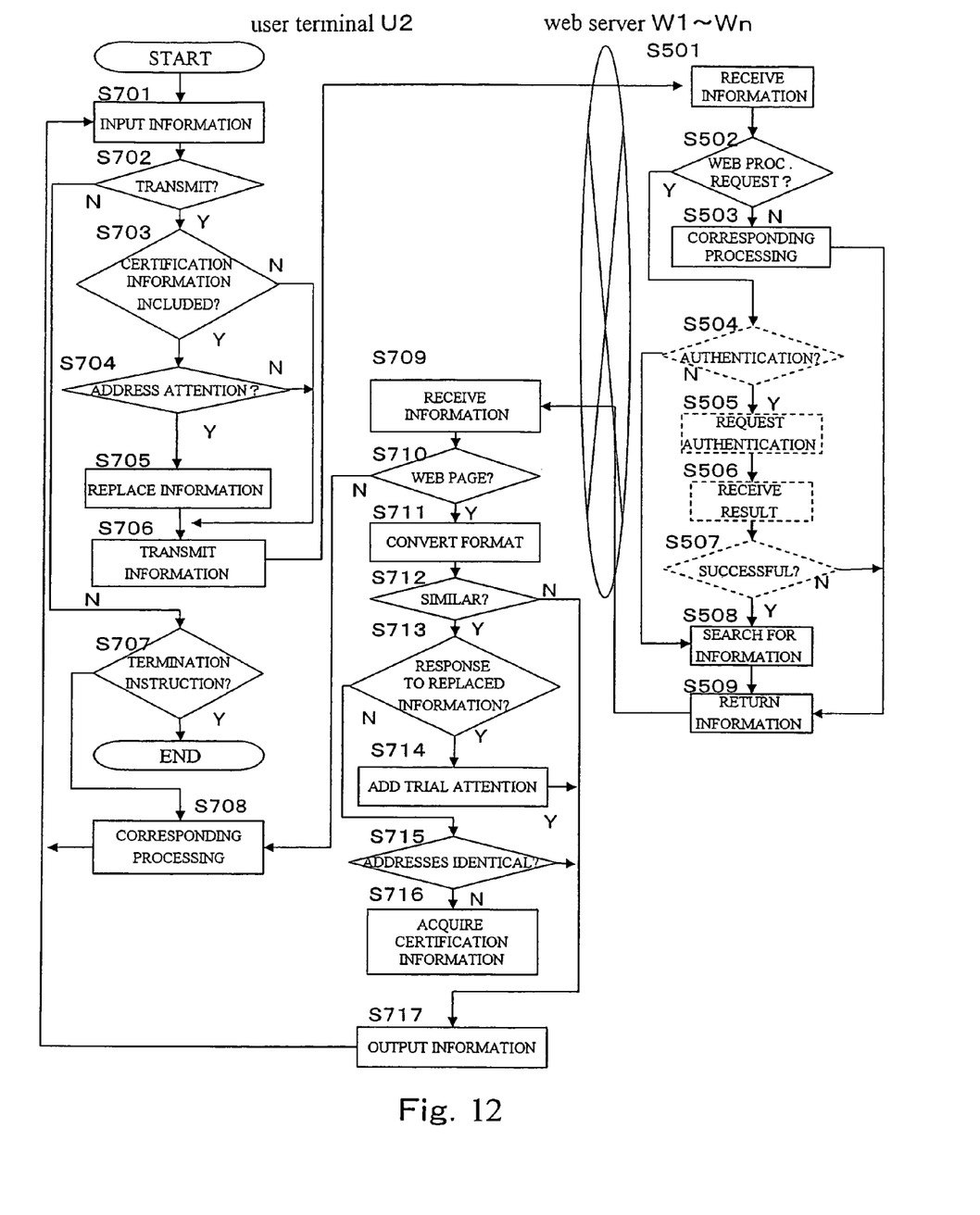
FIG. 12 is a flowchart showing a process for preventing fraud of certification information according to a fourth embodiment of the present invention.

A method for preventing fraud of certification information according to a fourth embodiment of the present invention will be described with reference to FIG. 12. FIG. 12 is a flowchart showing a process of a system for preventing fraud of certification information according to the fourth embodiment. FIG. 12 shows a processing flow corresponding to the flowchart shown in FIG. 9 in a case where the processing performed by the user terminal U1 and the gateway server G1 shown in FIG. 9 is performed by the user terminal U2. In comparison to the process of the method for preventing fraud of certification information according to the third embodiment shown in FIG. 11, the process shown in FIG. 12 further includes the processing of step S704, and the processing of step S716 is different. These different points will be described hereinafter.

In step S704, if the comparison unit U25 determines that the received information includes the same value as any of the parameters U2412 by referring to the certification information table U241 (see FIG. 2) stored in advance in the information storage unit U24 (Yes in step S703), the controller U27 determines whether or not the input information includes a web page in which the address attention message U2441 shown in FIG. 6 is added in step S716, described below (step S704). If it is determined that the information does not include the web page in which the address attention message U2441 shown in FIG. 6 is added (No in step S704), the information requested by the instruction input in step S701 is transmitted as the transmission information in step S706. If it is determined that the received information includes the web page in which the address attention message G1241 shown in FIG. 6 is added (Yes in step S704), the processing of step S705 for replacing the information is performed.

In step S716, if the comparison unit U25 compares the address U2421 associated with the file name U2422 of the web page appearance information U243 that is determined as the similar appearance in step S712, which is retrieved from the web page information table U242 (see FIG. 3) stored in advance in the information storage unit U24, with the address of the received web page, and the addresses differ from each other (No in step S715), the address attention message U2441 shown in FIG. 6 is added to the information received in step S709, and the resulting information is output from the output unit U23 in step S717 (step S717). FIG. 10 shows an output web page with the address attention message U2441.

In the first and third embodiments, if the web page processing request includes the same value as any of the parameters G1212, i.e., certification information, the web page processing request is replaced by trial information to test normal authentication, and a response is obtained. A web page that looks like the authentic web page and that has a different address can possibly be a fraud web page for phishing, and a request for this web page is replaced by trial information without an inquiry to the user, and a response is obtained. Thus, a web page that is an authentication response based on this trial information and a trial attention message are output to the user terminal, and the user can therefore check for a phishing web page based on the output result, thereby preventing certification information fraud beforehand.

In the second and fourth embodiments, if the web page processing includes the same value as any of the parameters G1212, i.e., certification information, and if this certification information indicates an input value of a web page with an address attention message because it looks like the authentic web page and has a different address, that is, a web page that can possibly be a phishing web page, the certification information is replaced by trial information, and an authentication test is not performed on the authentic web page. Therefore, with respect to a web page that looks like the authentic web page, which is suspected to be a phishing web page, a web page that is an authentication response based on trial information and a trial attention message are output to the user terminal, and the user can check for a phishing web page based on the output result, thereby preventing certification information fraud beforehand.

In the foregoing embodiments, either the gateway server G1 or the user terminal U2 includes an information storage unit, a comparison unit, and a trial unit. However, the present invention is not limited to these embodiments, and any other combination of the information processors and the components may be used without departing from the scope of the present invention.

What is claimed is:

1. A method for preventing certification information from fraud, in an information processor having information storage means, comprising:

providing the information storage means with web page appearance information on each of one or more authentic web pages in association with certification information of the each of one or more authentic web pages, the web page appearance information representing a displayed view of web page data included in a web page;

acquiring web page data from a web server via a communication network;

comparing appearance information on the web page data acquired with web page appearance information provided for the information storage means in association with certification information provided for the information storage means, so as to determine similarity between displayed views of the acquired web page and each of the one or more authentic web pages;

transmitting a trial web page acquisition request to the web server via the communication network when the information storage means is determined to include web page appearance information similar to the web page appearance information on the web page data acquired as a result of comparison performed, the trial web page acquisition request being configured to include the web page data that is acquired and modified to include, as certificate information, trial information different from the certification information provided for said information storage means in association with the similar web page appearance information;

acquiring, from the web server via the communication network, reply web page data that is web page data transmitted as a response to the trial web page acquisition request; and outputting an attention message about authenticity together with the acquired reply web page data to a display of a user terminal.

2. A method for preventing certification information from fraud, in an information processor having information storage means, comprising:

providing the information storage means with certification information on each of one or more authentic web pages in association with a user;

determining whether or not a web page acquisition request from a user includes certification information identical to the certification information provided for the information storage means in association with the user;

transmitting a trial web page acquisition request to a web server via a communication network when said certification comparison determines that the web page acquisition request from said user includes certification information identical to the certification information provided for the information storage means in association with the user, the trial web page acquisition request being configured to include, as certificate information, trial information different from the certification information included in the web page acquisition request from said user;

acquiring, from the web server via the communication network, reply web page data that is web page data transmitted as a response to the trial web page acquisition request; and outputting an attention message about authenticity together with the acquired reply web page data to a display of a user terminal.

3. The method for preventing certification information from fraud according to claim 1, further comprising:

providing said information storage means with an address in association with the web page appearance information; and comparing the address provided for said information storage means in association with the web page appearance information with an address of the web page data acquired when said information storage means is determined to include web page appearance information similar to the appearance information on the web page data acquired as a result of comparison performed in said appearance comparison;

wherein said transmitting transmits a trial web page acquisition request to the web server when said information storage means is determined to include web page appearance information similar to the appearance information on the web page data acquired as a result of comparison performed and when the address corresponding to the similar web page appearance information provided for said information storage means and the address of the web page data acquired are determined to differ as a result of comparison performed, the trial web page acquisition request being configured to include, as certification information, trial information different from the certification information provided for said information storage means in association with the similar web page appearance information.

4. The method for preventing certification information from fraud according to claim 1, wherein said comparing compares the web page data acquired with the web page appearance information provided for said information storage means, after converting the web page data acquired into the same format as the web page appearance information provided for said information storage means.

5. A computer readable recording medium storing a program for preventing certification information from fraud, in an information processor having information storage means, the program, when executed, causing a computer to perform a process comprising:

providing the information storage means with web page appearance information on each of one or more authentic web pages in association with certification information of the each of one or more authentic web pages, the web page appearance information representing a displayed view of web page data included in a web page;

acquiring web page data from a web server via a communication network;

comparing appearance information on the web page data acquired with web page appearance information provided for the information storage means in association with certification information provided for the information storage means, so as to determine similarity between displayed views of the acquired web page data and each of the one or more authentic web pages;

transmitting a trial web page acquisition request to the web server when the information storage means is determined to include web page appearance information similar to the web page appearance information on the web page data acquired as a result of comparison performed, the web page acquisition request being configured to include the web page data that is acquired and modified to include, as certification information, trial information different from the certification information provided for said information storage means in association with the similar web page appearance information;

acquiring, from the web server via the communication network, reply web page data that is web page data transmitted as a response to the trial web page acquisition request; and outputting an attention message about authenticity together with the acquired reply web page data to a display of a user terminal.

6. The computer readable recording medium storing a program according to claim 5, further comprising:

providing said information storage means with an address in association with the web page appearance information; and comparing the address provided for said information storage means in association with the web page appearance information provided for said information storage means, with an address of the web page data acquired when said information storage means is determined to include web page appearance information similar to the appearance information on the web page data acquired as a result of comparison performed;

wherein said transmitting includes transmitting a trial web page acquisition request to a web server when said information storage means is determined to include web page appearance information similar to the appearance information on the web page data acquired as a result of comparison performed and when the address corresponding to the similar web page appearance information provided for said information storage means and the address of the web page data acquired are determined to differ as a result of the comparing, the web page acquisition request being configured to include, as certification information, trial information different from the certification information provided for said information storage means in association with the similar web page appearance information.

7. The computer readable recording medium storing a program according to claim 5, wherein said comparing compares the web page data acquired with the web page appearance information provided for said information storage means, after converting the web page data acquired into the same format as the web page appearance information provided for said information storage means.

8. A system for preventing certification information from fraud, comprising:

acquisition means for acquiring web page data from a web server via a communication network;

information storage means for providing web page appearance information on each of one or more authentic web pages in association with certification information of the each of one or more authentic web pages, the web page appearance information representing a displayed view of web page data included in a web page;

appearance comparison means for comparing appearance information on the web page data acquired by said acquisition means with the web page appearance information provided for said information storage means, so as to determine similarity between displayed views of the acquired web page data and web page data included in each of the one or more authentic web pages;

trial means for transmitting a trial web page acquisition request to the server via the communication network when said information storage means is determined to include web page appearance information similar to the appearance information on the web page data acquired by said acquisition means as a result of comparison performed by said appearance comparison means, the web page acquisition request being configured to include the web page data that is acquired by said acquisition means and modified to include, as certification information, trial information different from the certification information provided for said information storage means in association with the similar web page appearance information; and message output means for outputting an attention message about authenticity together with the acquired web page data to a display of a user terminal, wherein the acquisition means acquires, from the web server via the communication network, reply web page data that is web page data transmitted as a response to the trial web page acquisition request, and the acquired reply web page data is outputted together with the attention message about authenticity to the display of the user terminal by the message output means.

9. The system for preventing certification information from fraud, according to claim 8, wherein said information storage means is further provided with an address in association with the web page appearance information;

said system further comprising:

an address comparison means for comparing the address provided for said information storage means in association with the web page appearance information with an address of the web page data acquired by said acquisition means when said information storage means is determined to include web page appearance information similar to the appearance information on the web page data acquired by said acquisition means as a result of comparison performed by said appearance comparison means;

wherein said trial means transmits a trial web page acquisition request to a web server when said information storage means is determined to include web page appearance information similar to the appearance information on the web page data acquired by said acquisition means as result of comparison performed by said appearance comparison means and when the address corresponding to the similar web page appearance information provided for said information storage means and the address of the web page data acquired in said acquisition means and determined to differ as a result of comparison performed by said address comparison means, the web page acquisition request being configured to include, as certification information, trial information different from the certification information provided for said information storage means in association with the similar web page appearance information.

10. The system for preventing certification information from fraud, according to claim 8, wherein said appearance comparison means compares the web page data acquired by said acquisition means with the web page appearance information provided for said information storage means, after converting the web page data acquired by said acquisition means into the same format as the web page appearance information provided for said information storage means.

* * * * *